US008113936B2

(12) United States Patent
Filipour et al.
(10) Patent No.: US 8,113,936 B2
(45) Date of Patent: Feb. 14, 2012

(54) TIME-BASED CASINO GAMING USING CUMULATIVE PAYTABLES

(75) Inventors: Cameron Anthony Filipour, Las Vegas, NV (US); Adam Singer, Henderson, NV (US); Alexander Popovich, Henderson, NV (US); Thierry Brunet De Courssou, Henderson, NV (US)

(73) Assignee: IGT, Reno, NV (US)

( * ) Notice: Subject to any disclaimer, the term of this patent is extended or adjusted under 35 U.S.C. 154(b) by 646 days.

(21) Appl. No.: 12/262,711

(22) Filed: Oct. 31, 2008

(65) Prior Publication Data

US 2009/0117962 A1 May 7, 2009

Related U.S. Application Data

(60) Provisional application No. 60/984,673, filed on Nov. 1, 2007.

(51) Int. Cl.
*A63F 9/24* (2006.01)
*G06F 17/00* (2006.01)

(52) U.S. Cl. ................ 463/16; 463/20; 463/27; 463/26; 273/292

(58) Field of Classification Search ........................ None
See application file for complete search history.

(56) References Cited

U.S. PATENT DOCUMENTS 4,593,904 A 6/1986 Graves
4,695,053 A 9/1987 Vazquez et al.
5,265,874 A 11/1993 Dickinson et al.
5,280,909 A 1/1994 Tracy
5,290,033 A 3/1994 Bittner et al.
5,342,049 A 8/1994 Wichinsky et al.
5,354,202 A 10/1994 Moncrief et al.
5,743,523 A 4/1998 Kelly et al.
5,816,913 A 10/1998 Nakamura
5,823,873 A 10/1998 Moody
5,890,963 A 4/1999 Yen
5,910,046 A 6/1999 Wada et al.
6,012,983 A 1/2000 Walker et al.
6,019,374 A 2/2000 Breeding
6,048,269 A 4/2000 Burns et al.
6,050,895 A 4/2000 Luciano, Jr. et al.
6,077,163 A 6/2000 Walker
6,146,273 A 11/2000 Olsen
6,171,186 B1 1/2001 Kurosawa et al.
6,179,713 B1 1/2001 James et al.
6,182,086 B1 1/2001 Lomet et al.

(Continued)

FOREIGN PATENT DOCUMENTS

GB 2170937 A 8/1986

(Continued)

*Primary Examiner* — Paul A. D'Agostino
(74) *Attorney, Agent, or Firm* — Clise, Billon & Cyr, P.A.; Richard Billion

(57) ABSTRACT

Tournament-Style casino games bring players all of the advantages of gaming tournaments such as rapid play, building excitement, and player vs. player competition in a manner that addresses limitations of existing games by: a) generating revenue for tire casino in all featured embodiments; b) being available on-demand; c) paying winners instantaneously; and d) featuring a casino hold that is stable enough to meet regulator requirements. In one embodiment of tournament style gaming, a high score progressive jackpot is provided such that players are playing against both the game's built in pay table and against the daily performances of other players. Inefficient game play results in increasing the progressive jackpot by a value of the time wasted by such inefficient game play.

30 Claims, 10 Drawing Sheets

U.S. PATENT DOCUMENTS

| | | | |
|---|---|---|---|
| 6,238,288 | B1 | 5/2001 | Walker et al. |
| 6,244,957 | B1 | 6/2001 | Walker et al. |
| 6,267,669 | B1 | 7/2001 | Luciano, Jr. et al. |
| 6,283,474 | B1 | 9/2001 | de Keller |
| 6,319,127 | B1 | 11/2001 | Walker |
| 6,409,597 | B1 | 6/2002 | Mizumoto |
| 6,425,823 | B1 | 7/2002 | Byrne |
| 6,428,413 | B1 | 8/2002 | Carlson |
| 6,517,433 | B2 | 2/2003 | Loose et al. |
| 6,522,312 | B2 | 2/2003 | Ohshima et al. |
| 6,645,075 | B1 | 11/2003 | Gatto |
| 6,656,047 | B1 | 12/2003 | Tarantino |
| 6,749,510 | B2 | 6/2004 | Giobbi |
| 6,761,632 | B2 | 7/2004 | Bansemer et al. |
| 6,761,636 | B2 | 7/2004 | Chung et al. |
| 6,811,482 | B2 | 11/2004 | Letovsky |
| 7,011,581 | B2 | 3/2006 | Tarantino |
| 7,081,050 | B2 | 7/2006 | Tarantino |
| 7,094,149 | B2 | 8/2006 | Walker |
| 7,140,964 | B2 | 11/2006 | Walker |
| 7,156,739 | B2 | 1/2007 | Walker |
| 7,179,168 | B1 | 2/2007 | Walker |
| 7,291,067 | B2 | 11/2007 | Tarantino |
| 7,291,070 | B2 | 11/2007 | Gatto et al. |
| 7,371,173 | B2 | 5/2008 | Gatto et al. |
| 2002/0128065 | A1 | 9/2002 | Chung et al. |
| 2002/0132660 | A1 | 9/2002 | Taylor |
| 2002/0147040 | A1 | 10/2002 | Walker |
| 2003/0171140 | A1 | 9/2003 | Gatto et al. |
| 2003/0211881 | A1 | 11/2003 | Walker |
| 2004/0102238 | A1* | 5/2004 | Taylor ............................. 463/16 |
| 2004/0185929 | A1* | 9/2004 | Walker et al. ................... 463/16 |
| 2004/0204246 | A1* | 10/2004 | Halliburton et al. ............ 463/42 |
| 2004/0242320 | A1* | 12/2004 | Jackson .......................... 463/26 |
| 2005/0148377 | A1 | 7/2005 | Goldberg et al. |
| 2005/0192087 | A1 | 9/2005 | Friedman et al. |
| 2006/0025207 | A1 | 2/2006 | Walker |
| 2006/0214376 | A1* | 9/2006 | Weller .......................... 273/292 |
| 2006/0281509 | A1 | 12/2006 | Arias-Vargas et al. |
| 2007/0087818 | A1 | 4/2007 | Walker |
| 2007/0142108 | A1 | 6/2007 | Linard et al. |
| 2007/0155465 | A1* | 7/2007 | Walker et al. ................... 463/16 |
| 2007/0191084 | A1* | 8/2007 | Tarantino ........................ 463/16 |
| 2007/0298857 | A1 | 12/2007 | Schlottmann |
| 2008/0015004 | A1 | 1/2008 | Gatto |
| 2008/0287185 | A1* | 11/2008 | Yoseloff et al. ................. 463/27 |
| 2009/0117989 | A1* | 5/2009 | Arezina et al. .................. 463/20 |

FOREIGN PATENT DOCUMENTS

WO WO0141892 A2 6/2001

* cited by examiner

TIME-BASED CASINO GAMING USING CUMULATIVE PAYTABLES

CROSS-REFERENCE TO RELATED APPLICATIONS

This application claims priority under 35 U.S.C. §119(e) to Provisional Application No. 60/984,673, filed Nov. 1, 2007, which application is hereby incorporated herein by reference in its entirety.

BACKGROUND OF THE INVENTION

Embodiments of the present inventions relate generally to the field of regulated pay computer-controlled games, either games of skill or games of chance.

SUMMARY OF THE INVENTION

Time-based casino gaming using cumulative pay tables (referred to hereafter as "tournament-style gaming") brings players all of the advantages of gaming tournaments such, as rapid play, building excitement, and player vs. player competition in a manner mat addresses the limitations of conventional tournaments by: a) generating revenue for the casino in all offered embodiments; b) being available on-demand; c) paying winners instantaneously; and d) featuring a casino hold that is stable enough to meet regulatory requirements. In one embodiment of tournament style gaming, players purchase time-based contracts and compete against a session pay table, earning increasingly larger instant rewards as the cumulative score earned within their gaming session rises. A second embodiment of tournament style gaming adds a (e.g., daily) high score progressive jackpot such that players are playing against both the game's built in pay table and the daily performances of other players. Both embodiments give the player all of the excitement of competing in a timed tournament, together with an entirely new level of flexibility.

The daily progressive feature not only enhances the player's excitement in playing tournament style games and gives the game a layer of player vs. player competition, it also standardizes the game's hold. A small percentage of each wager input on a tournament style game may be used to fund the daily high score progressive jackpot. When players play inefficiently or waste time, the value of the time they have not used may be converted into currency and added to the progressive pool to be won at the end of the day or at some other predetermined point in time. This automatic transfer of funds ensures that the game's returns will be standard and reliable, a feature that satisfies the demands of gaming regulators in jurisdictions having a mandated casino hold range.

According to an embodiment thereof, the present invention is a method of determining rewards due to a player of an electronic game on a regulated gaming machine. The method may include steps of accepting currency from a player and using a first portion of the currency to fund a progressive jackpot to be awarded after a predetermined point in time and using a second portion of the currency to purchase a predetermined duration of game play on a primary game; allowing the player to initiate sub-wagers during the duration and keeping a cumulative score according to outcomes of the initiated sub-wagers; when the predetermined duration is over, determining whether the player's cumulative score entitles the player to a reward and if so, paying the reward to the player; determining whether the player initiated sub-wagers at a rate that is lower than an optimal rate at which the player could have placed sub-wagers during the duration and, if so, increasing the progressive jackpot, and at or after the predetermined point in time, awarding at least a portion of the progressive jackpot to at least the player if the player's cumulative score was a high score that remains a high score at the predetermined point in time.

The predetermined point in time may be hourly, daily, weekly, monthly or yearly, for example. The gaming machine may be coupled to a plurality of other gaming machines over a network and the method may further include a step of storing one or more high, scores from among all of the plurality of other gaming machines on a server coupled to the network, a step of determining whether the player's cumulative score exceeds one or more high scores stored on the server and a step of awarding all or a portion of the progressive jackpot to the player if one of the high scores stored on the server is the player's high score. The method may also include a step of displaying a current size of the progressive jackpot on the gaming machine. A step may be carried out of providing a jackpot redemption ticket to the player if the player's score is established as the high score, the jackpot redemption ticket enabling the player to check whether the player has won at least a portion of the progressive jackpot. The jackpot redemption ticket providing step may be carried out with the jackpot redemption ticket being configured to enable the player to check whether the player has won at least a portion (i.e., all or part) of the progressive jackpot at the gaming machine and/or remotely. The gaming machine may be located in a first casino and one or more of the plurality of gaming machines may be located in a second casino. The accepting step may be carried out with the electronic game on which game play is enabled being a gaming console-type video game, an arcade-type video game or a video pinball game, to name but a few possibilities. The method may further include a step of configuring the regulated game of chance such that, on average, players that initiate a greater number of sub-wagers during the duration earn a higher cumulative score and a higher reward than players that initiate a comparatively smaller number of sub-wagers during the duration. The keeping step may be carried out with the player's cumulative score having no cash value before the duration is over. The keeping step may be carried out with the player's cumulative score having no cash value until after the duration is over and only having a non-zero cash value if the player's score reaches or exceeds one or more predetermined threshold values.

Another embodiment of the present inventions is a regulated gaining machine configured to enable a player to play an electronic game. Such a regulated gaining machine may include a user interface, the user interface being configured to accept currency from a player, a first portion of the currency being used to fund a progressive jackpot to be awarded after a predetermined point in time and a second portion of the currency being used to purchase a predetermined duration of game play on a primary game, the user interface being further configured to enable the player to initiate sub-wagers during the predetermined duration, and a player score meter to track a cumulative score of the player according to outcomes of the initiated sub-wagers for the duration. Such a gaming machine may further be configured, when the predetermined duration is over, to determine whether the cumulative score entitles the player to an immediate reward and if so, to pay the reward to the player and to determine whether the cumulative score matches or exceeds a pre-stored high, score and if so, establishing the cumulative score as a new high score. The gaming machine may also be configured, at or after the predetermined point in time, to determine whether the player initiated sub-wagers at a rate that is lower than an optimal rate at which the player could have placed sub-wagers during the duration and, if so, to increase the progressive jackpot, the gaming machine being further configured to award at least a portion of the progressive jackpot to at least the player (i.e., a portion to the player and another portion to one or more other players) if the player's cumulative score was established as a high score and remains a high score at the predetermined point in time.

The predetermined point in time may be hourly, daily, weekly, monthly or yearly, for example. The gaming machine may be configured to store one or more high scores on a server coupled to the network, the gaming machine being further configured to award at least a portion of the progressive jackpot to at least the player if one of the high scores stored on the server is the player's high score. The gaming machine may further include a progressive jackpot meter to display a current size of the progressive jackpot. The gaming machine may be further configured to provide a jackpot redemption ticket to the player if the player's cumulative score is established as the new high score, the jackpot redemption ticket enabling the player to check whether he or she has won all or a portion of the progressive jackpot. The jackpot redemption ticket may be configured to enable the player to check whether the player has won at least a portion of the progressive jackpot, at the gaming machine and/or remotely. The electronic game may be a gaming console-type video game, an arcade-type video game or a video pinball game, for example. The gaming machine may be further configured such that, on average, players that initiate a greater number of sub-wagers during the predetermined duration earn a higher reward than players that initiate a comparatively smaller number of sub-wagers during the predetermined duration. The player's cumulative score has no cash value before the duration is over. The player's cumulative score has no cash value until after the duration is over and only has a non-zero cash value if the player's cumulative score reaches or exceeds at least one predetermined threshold value.

Another embodiment of the present invention is a method of determining rewards due to a player of an electronic game on a regulated gaming machine, that includes steps of accepting money from a player and using a first portion of the money to purchase a predetermined duration of game play on a primary game and using a second portion of the money to fund a progressive jackpot to be awarded after a predetermined point in time; initiating the primary game and accepting a plurality of player-initiated sub-wagers; keeping a cumulative score across all of the plurality of sub-wagers, the cumulative score increasing whenever one of the plurality of sub-wagers has a successful outcome; at the end of the duration, determining whether the cumulative score entitles the player to a reward and if so, paying the reward to the player; determining whether the player wasted time by initiating sub-wagers at a rate that is lower than an optimal rate at which the player could have placed sub-wagers during the duration and, if so, increasing the progressive jackpot by a value of the wasted time, and at or after the predetermined point in time, awarding at least a portion of the progressive jackpot to at least the player if the player's cumulative score was established as a high score and remains a high score at the predetermined point in time.

The awarding step may be carried out with the high score being updated with high scores of other players until the predetermined point in time. The determining step may be carried out with the value of the wasted time being calculated using the first portion of the money and a number of sub-wagers initiated by the player during the duration. The accepting and rewarding steps may be carried out with the progressive jackpot returning to the player, on average, an amount equal to a difference between the second portion of the money and a casino hold. Similarly, the initiating step may be carried out with the primary game returning to the player, on average, an amount equal to a difference between the first portion of the money and a casino hold, provided that the player initiates sub-wagers at the optimal rate during the duration.

DETAILED DESCRIPTION

Figure 1:
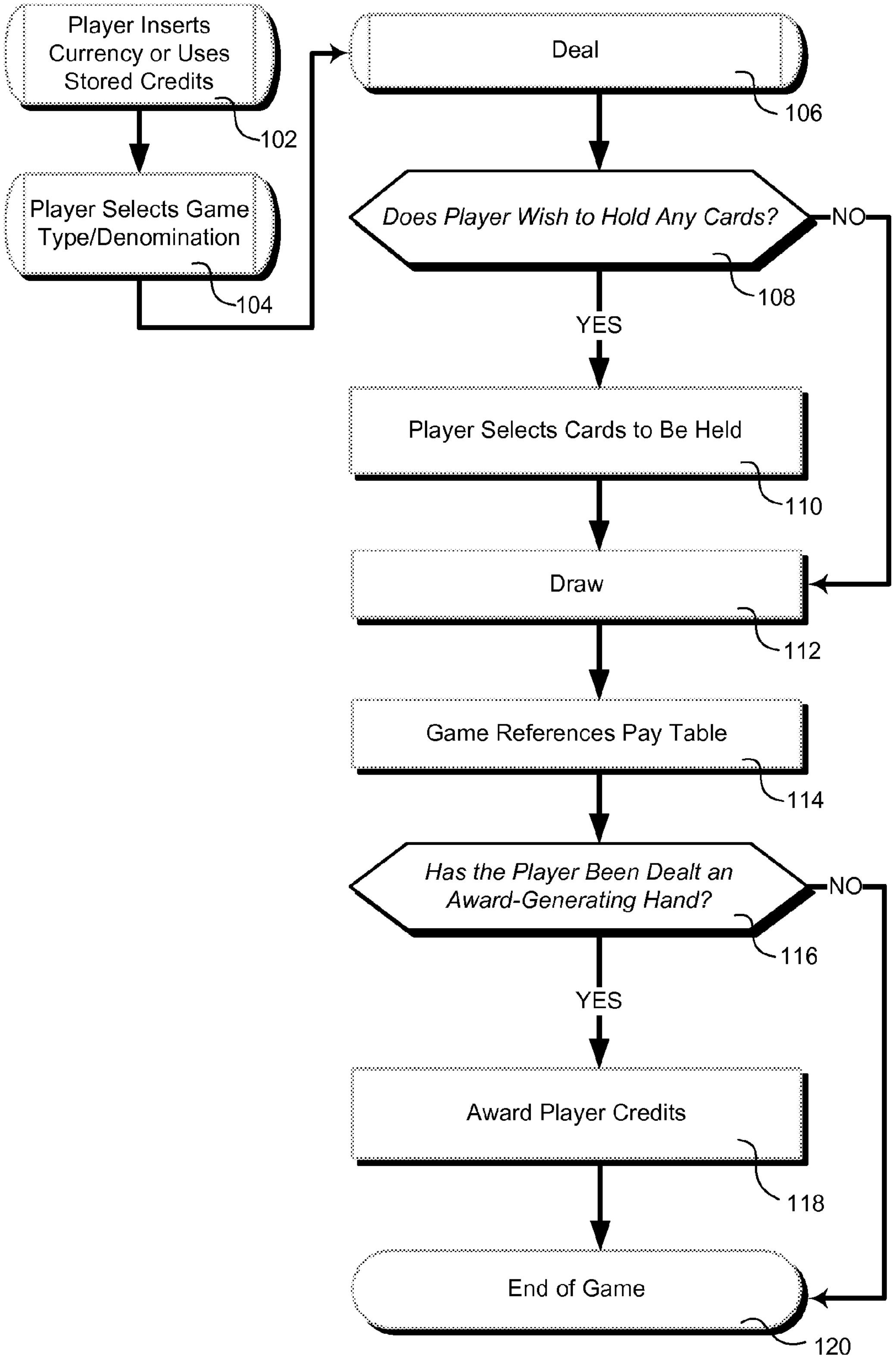
FIG. 1 shows game flow on a conventional video poker machine.

In the following detailed description of exemplary embodiments of the invention, reference is made to the accompanying drawings, which form a part hereof and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense.

The vast majority of electronic games of chance featured in casinos are offered to players on a game-by-game, per-credit basis. There is very little difference between the concept of a "game" and a "wager" on such machines. Players purchase a game for a predetermined number of credits, and that game represents a wager. When a wager results in a winning outcome, the player receives a financial reward, which is often a multiplier of the cost of his game. When a wager results in a losing outcome, the player loses the cost of his game. Traditional slot machines work in this way, increasing or decreasing the player's credits with each spin of the reels. Traditional video poker machines also work in this way, increasing or decreasing the player's credits with each hand of poker dealt. It should be noted that each wager on such machines represents a separate transaction; there is no relationship from one wager to the next built into traditional gaming machines.

While the betting dynamic detailed above is by far the most prominent on casino floors, there are several notable exceptions. Walker Digital has introduced "Guaranteed Play" gaming, which allows players to purchase a number of poker hands packaged together for one discounted rate. Cyberview Technology has introduced "Time Gaming," which allows players to purchase time on a gaming machine instead of credits. Both innovations have introduced welcome variety into the casino gaming environment by allowing players to purchase a series of wagers in novel ways. An integral part of the present inventions is the realization that neither of these innovations is able to link a series of games into one larger wager in such a way that a relationship between wagers is formed and the player's gaming session takes on a building sense of tension and excitement.

Gaming tournaments represent another alternative to the traditional betting dynamic. Many casinos hold tournaments regularly, either charging an entry fee or inviting select players who have qualified (often through frequent play of traditional games) to participate at no cost. Tournaments are often a reward for customer loyalty and they typically make use of customized, "player-friendly" gaming machines. These machines do not accept money, are programmed to deliver "wins" more frequently than traditional machines do, and typically function on a per time basis (although some tournament machines give players a fixed number of credits to play and some give player both credits and a time limit).

Players entered into such tournaments play as rapidly as they can dining the time allotted to them in hopes of earning a high score. In tournament using slot machines, for example, each spin of the reels does not result in a won or lost wager, but rather an opportunity to score points, points that continue to accumulate throughout the duration of the tournament. In many cases these points are referred to as "credits" on the machine but they are not true credits since they cannot be cashed out.

After a given tournament is completed, prizes are awarded to the players with the highest cumulative scores. Because casinos only have a limited number of machines configured for tournament play, many tournaments take place in multiple stages, meaning that winners often must wait several hours to claim their winnings.

Gaming tournaments as described above have proven to be tremendously popular, as players enjoy the arcade-style dynamic of games mat feature competition with oilier players and that reward rapid play and high cumulative scores. Such tournaments, however, are of limited appeal from the casino's perspective, in that they require time and effort to set up and in that many earn no revenue. Similarly, such tournaments are also only of limited appeal from the player's perspective, in that they are only available during specific times scheduled by the casino and that winners must wait until the tournament is over to be paid.

One challenge that has prevented game designers from developing on-demand, revenue-producing games that more closely approximate tournament conditions is the difficulty of designing time-based games that produce reliable, standardized returns. In many gaming jurisdictions, the percentage of each wager that a gaming machine holds must fall, by law, within a predetermined range. This mandate is readily met by traditional slot or video poker machines since all possible outcomes for each game are outlined and assigned a weighted probability that can be demonstrated through repeated testing in a laboratory. Games that are driven by time, however, present a new variable—time wasted—that has the potential to add instability to player returns. A player wagering on a traditional game may not negatively affect the percentage of his wager that will be returned to him by stalling. A player on a time-based machine, however, may reduce his return by playing slowly or may ensure that his return will be zero by starting a game and then failing to initiate any wagers during his window to play. Games that cannot demonstrate reliable, stable returns cannot be legally offered to players in most gaming jurisdictions. The current assignee has addressed this challenge in its time gaming U.S. Pat. No. 6,645,075, issued Nov. 11, 2003, which patent is hereby incorporated herein by reference in its entirety, by automatically increasing the size of a player's wager when the plays slowly and decreasing the size of his wager when he plays quickly. In the methods outlined therein, however, each wager represents a separate transaction and rapid play is not rewarded. From the foregoing, it may also be appreciated that another integral part of the present inventions is the realization that a time-based game that is available on demand and that more closely approximates tournament conditions by rewarding rapid play and by grouping a series of smaller sub-wagers into one exciting cumulative wager would also be highly desirable.

FIG. 1 shows game flow on a conventional video poker machine. Before a conventional video poker game may be initiated, the player must insert funds as shown at 102 and select a game type as shown at 104. Traditional video poker game options typically available to players include differing pay tables and differing bet denominations. Given these variables, traditional game types are generally configured according to some combination of available pay tables and bet denominations.

After a game type has been selected and the player has inserted the necessary funds, the player may start his game by pressing the "DEAL" button, which causes cards to be dealt onscreen, as shown at 106. At 108, the player must then decide if any of the cards dealt to him are worth holding. As shown at 110, should the player elect to hold cards, he typically touches an electrical "HOLD" button on the gaining machine cabinet under the cards he wishes to hold or touches the cards themselves on the game machine's touchscreen. Whether the player has held any cards or not, he must press the "DRAW" button as shown at 112 to finalize his hand and advance the game to its next step. As shown, if the player does not wish to hold any cards (No branch of step 108), the method proceeds directly to step 112. At this point the player has a finalized hand. As shown at 114, the game will reference the player's hand against its internal pay table to determine whether the player has won any credits. If, as shown at 116, the player has been dealt a reward generating hand (such as two pair, a straight, a full house, etc.), then the game will award the player credits, as shown at 118 and the method proceeds to step 120, the end of the game. If, as shown at the No branch of step 116, the player has not been dealt a reward generating hand, then his game is over, as shown at 120.

It should be noted that in the traditional model, a player's gaming session typically comprises many games. Indeed, most players continue repeating the process detailed above until they run out of funds, win an amount with which they are satisfied, or simply lose interest. Because of the repetitive nature of this process, some players leave the game due to disinterest which, it may be appreciated, is not in the casino's best interest.

Figure 2:
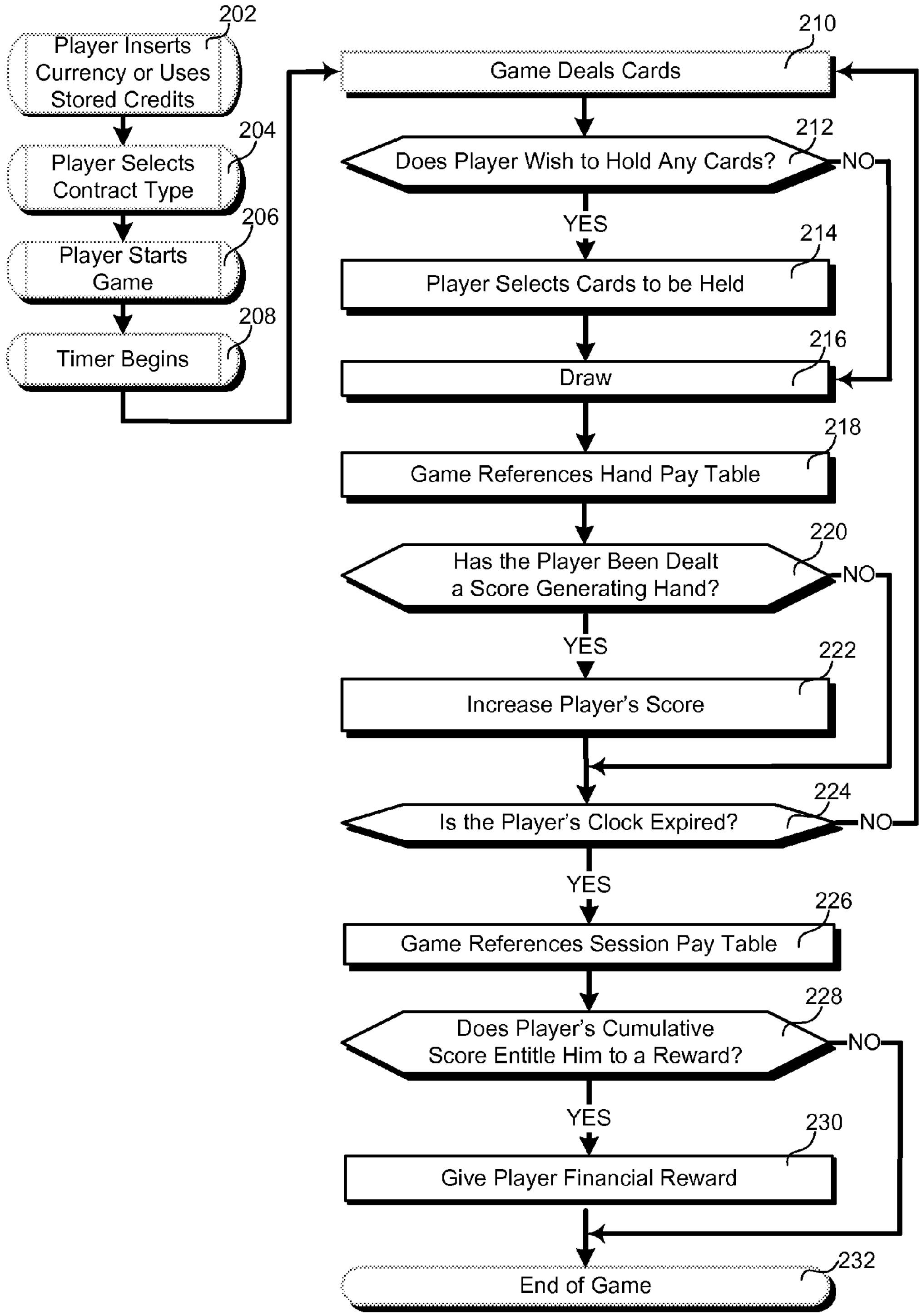
FIG. 2 shows game flow on a tournament style video poker machine, according to an embodiment of the present invention.

FIG. 2 shows game flow on a tournament style video poker machine, according to an embodiment of the present invention. As is the case with traditional machines, the player must insert funds at 202 before initiating a game. Instead of selecting a game type (i.e. pay table and denomination), tournament style players, according to embodiments of the present invention, may select a contract type, as shown at reference numeral 204. A player wagering on a tournament style video poker machine may, for example, purchase a five minute contract to play on the machine for $5—the duration of game play, therefore, may be proportional to the currency input into the regulated gaming machine, such that more money buys a contract of a longer duration and less money buys a contract of comparatively shorter duration. The player, in this manner, is paying for (purchasing) a predetermined amount of time of game play wherein more money buys more time and less money buys less time. Both the duration of the contract and its cost may be predetermined, packaged together, and presented to the player as a menu offering. According to embodiments of the inventions described herein, tournament style games may be delivered to game operators in customizable form, such that operators may select contract durations and costs that best meet the demands of their customers.

Because tournament style games according to embodiments of the present invention are time-based, players must press a start button as shown at 206 to initiate the timer and to begin their gaming session, as shown at 208. A single hand of video poker, played according to the tournament style gaining model of embodiments of the present invention, begins with cards being dealt to the player, as shown at 210. At 212, the player may then decide if he wishes to hold one or more of those cards as shown by the Yes branch of 212 and step 214. The player may then select those cards he wishes to hold. If the player does not wish to hold any cards, the method proceeds to step 216, as shown by the No branch of step 212. At 216, the game draws new cards after the player has pressed the DRAW button. According to embodiments of the present invention, the game then references an internal Hand Pay Table as shown at 218 to determine if the player's finalized hand has generated a reward, as shown at 220. It should be noted that, according to embodiments of the present invention, the Hand Pay Table is one of two pay tables included in a tournament style game. Other embodiments of the present inventions may be configured with more than two pay tables, as those of skill in this art may appreciate. In contrast, traditional video poker games have only one pay table.

If the player's finalized hand has generated a reward, the player's score is increased, as shown by the Yes branch of step 220 and step 222. If the player's hand has not generated a reward, game play proceeds to step 224, as shown by the No branch of step 220. Departing from the traditional model further, players who have been dealt a reward-generating hand in tournament style video poker are not awarded credits that they may cash out at any time. Instead, according to embodiments of the present invention, players may be awarded points that contribute to a cumulative score that they continue to build throughout their gaming session (the duration of which is based upon the contract purchased in step 204), as shown at 222. The score that a player earns for a reward generating hand in this model has no cash value in isolation; it achieves its value by contributing to a cumulative session score only.

So long as a player has time remaining in his session, he will retain the ability to be dealt cards and try to increase his score, as shown by the No branch of step 224. When the player's timer reaches zero as shown in the Yes branch of step 224, then the player's cumulative score is captured and compared to the second of the game's internal pay tables, the session pay table 226. If the player's score meets the minimum criteria associated with a reward within the Session Pay Table as shown in the Yes branch of step 228, then he is given a credit award (which does have a monetary value and may be cashed out), as shown at 230. After the player's time has expired and he has been given any credits owed to him, the player's gaming session is over, as shown at 232. Likewise, if the player's score does not meet the minimum criteria associated with a reward within the Session Pay Table, the player's game session is over, as shown by the No branch of step 228. Unlike traditional single-hand, single-wager video poker games, the tournament style player's game may include many hands (i.e. sub-wagers) that contribute to one large game—that is, each hand contributes a score specific to that hand and the scores of each hand are summed to calculate the cumulative score for the tournament style large game.

It should be noted that both traditional video poker pay tables and tournament style Hand Pay Tables (the first of the two pay tables of embodiments of the present inventions) equate a specific poker hand to a specific reward. In contrast, tournament style Session Pay Tables (the second of the two pay tables of embodiments of the present invention) equate a range of session scores to a specific reward. For example, when playing a traditional video poker machine, a player is typically compensated 9 credits for a Full House. In this case, specific hands are associated with predetermined rewards on a one-to-one basis. In contrast, according to embodiments of the present invention, the Session Pay Table in a tournament style associates a range of scores with a predetermined reward on a many-to-one basis. For example, a tournament style "Jacks or Better" poker pay table may stipulate that a player earning a cumulative score falling within a range of 151-200 points during his gaining session earns exactly 10 credits. In that example, three different players with respective final scores of 152, 166, or 198 would each receive 10 credits at the end of their session.

Figure 3:
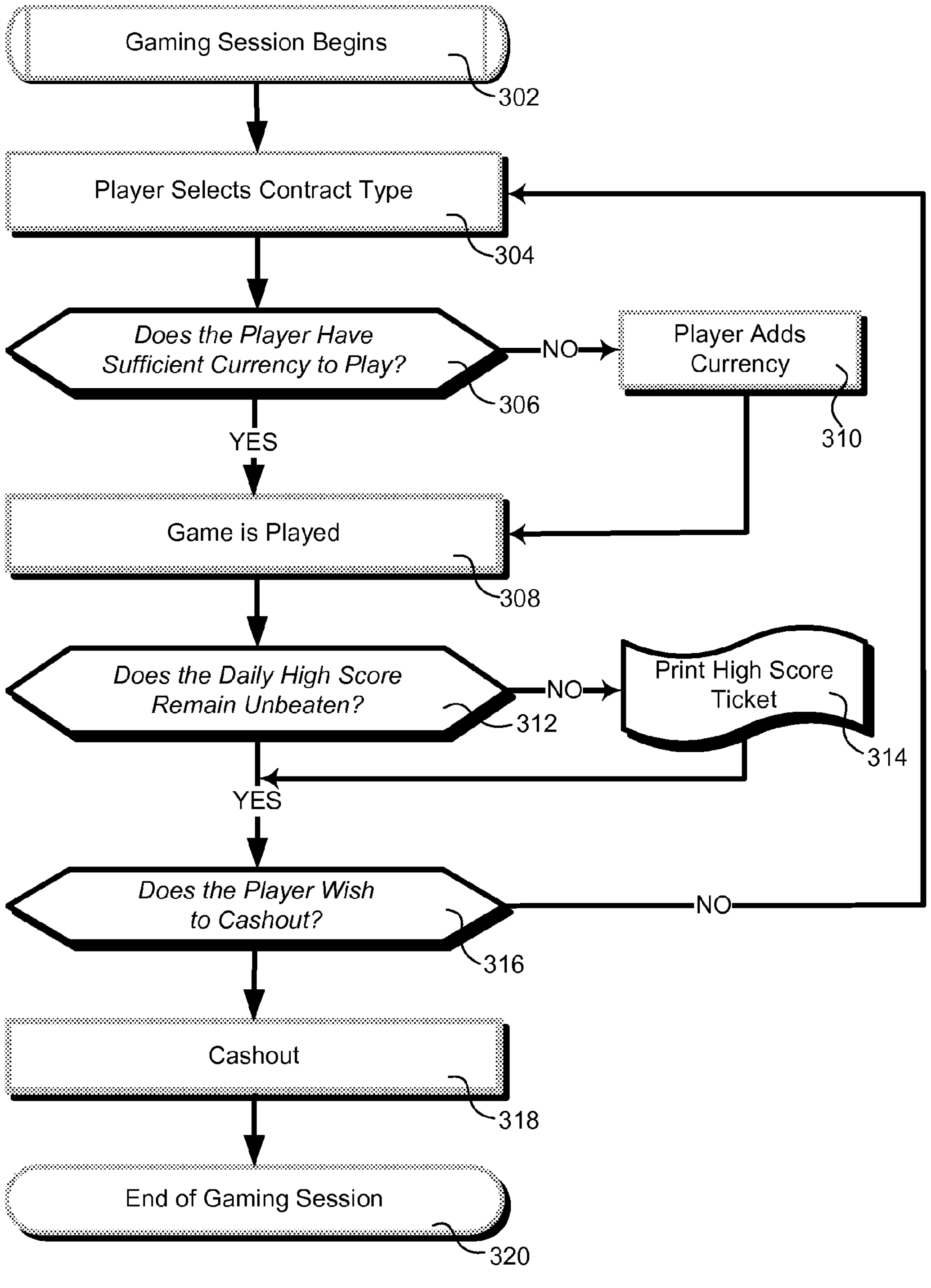
FIG. 3 shows how the daily progressive jackpot feature fits into high level game play on a tournament style game, according to an embodiment of the present invention.

FIG. 3 demonstrates how the daily progressive jackpot feature fits into high level game play on a tournament style game, according to an embodiment of the present invention. Whereas FIG. 2 details game flow for a particular game class—in this case, video poker—the tournament style gaming model may be applied to a number of electronic games of chance including but not limited to: slot machines, video poker, video roulette, video craps, video keno, and video bingo, for example.

According to one embodiment, tournament style gaming makes use of a daily progressive jackpot to add player-vs.-player competition and increased excitement to the player's gaming experience. In addition, the daily progressive feature satisfies the requirements of gaming regulators and helps ensure stability within each game's accounting by applying funds not used by players back into a community jackpot instead of holding them.

After a gaming session on a tournament style game begins at 302, the player may be prompted to select a contract type as shown at 304. If supported by the gaming machine, this decision may include selecting one or more of the following: a game class (i.e. video poker, slot machines, video roulette), selecting a package price (i.e. five minutes of play for $5 or fifteen minutes of play for $12, for example), selecting a game theme (i.e. a jungle themed slot machine vs. an underwater themed slot machine, for example), and/or selecting from any other features operators wish to make available.

If the player has sufficient credit balance on the machine to begin a game as shown at the Yes branch of step 306, he will be able to initiate the clock on his session and begin game play as shown at 308 (detailed thoroughly in FIG. 2). If, however, the player has an insufficient balance, as shown by the No branch of step 306, the player may be invited to add currency (money) into his gaming machine, as shown at 310.

After the player's game is over, his score will be compared to the game's daily high score of the day (or other predetermined period), as shown at 312. If the player has not tied or exceeded the preexisting daily high score, as show by the Yes branch of step 312 no special action will be taken. If the player has tied or exceeded that score, as shown by the No branch of 312, his score will be reflected as the new high score that may be displayed on the gaming machine (and all other tournament style gaming machines linked to the same network) and the player may be issued a ticket, as shown at 314, prompting him to check if has won the daily high score jackpot the next day. In one embodiment of tournament style gaming, the player may return to the casino the next day, insert his ticket back into any tournament style gaming machine or other suitable device coupled to the network, and determine if he has won—that is, whether his high score has not been exceeded by another player. This embodiment is advantageous to game operators as it allows them to boost customer loyalty and retention. In another embodiment, the player may also log into a dedicated Internet page and enter a code listed on his gaming ticket to determine if his ticket is a winner. This embodiment is advantageous to players as it allows them save the time and effort of returning to the casino to check a losing ticket. Other methods of determining whether the player's ticket is a winner may be implemented within the context of the present invention, as those of skill in this art will readily appreciate. For example, the casino may notify the player if he was won, without requiring any action on the player's part. For example, an email or other communication may be sent to the player to inform the player whether his ticket is a winning one. Alternatively, an automated voice mail message system may be used, based upon the information the player may have previously provided.

If the day is over and a player holds a high score ticket that has not been exceeded, he will be awarded the daily high score progressive jackpot. If, on the oilier hand, the player holds a high score ticket that has been exceeded he will win no award. If the player holds a high score that has been tied by one or more players, an embodiment of the present inventions calls for the players to each be awarded an equal share of the jackpot with all other players holding the same score. In the event that part or all of a daily jackpot goes unclaimed over a period of time predetermined by the game operator, all unclaimed funds may be added to a future jackpot such that future wagering on tournament style gaming machines is stimulated, thereby also insuring that the daily high score progressive jackpot satisfies the requirements of gaming regulators and helps ensure stability within each game's accounting by applying funds not claimed by players back into a community jackpot.

Returning now to FIG. 3, following the printing of the high score ticket (also known herein as a daily progressive jackpot redemption ticket) shown at 314, the method continues to step 316, wherein it is determined whether the player wishes to cash out. If not, the method reverts to step 304, thereby allowing the player to initiate further game sessions in an attempt to beat the daily high score. If the player does wish to cash out as shown by the Yes branch of 316, the player cashes out at 318, whereupon the game session ends at 320.

Figure 4A:
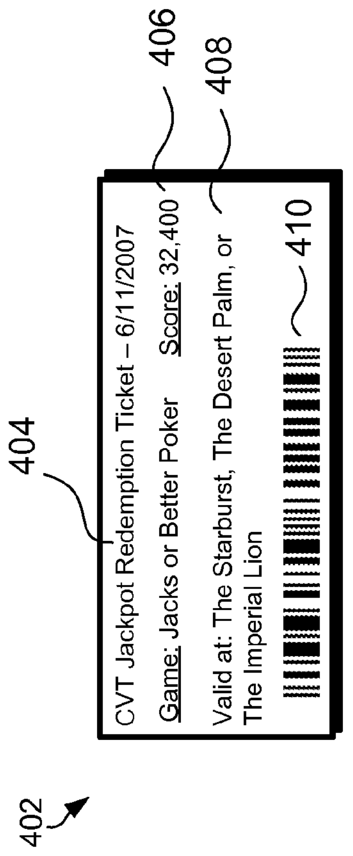
FIG. 4A depicts a first Daily Progressive Jackpot Redemption ticket style used within the tournament style gaming model, according to an embodiment of the present invention.

FIG. 4A depicts one exemplary style of a daily progressive jackpot redemption ticket 402, such as may be printed at step 314 in FIG. 3. The depicted exemplary ticket 402 may include, for example, a description tag 404 informing players of its purpose and the date on which, the ticket was earned or printed, an info tag 406 informing players on which game the ticket was earned and the player's top score, a redemption tag 408, informing players of the physical locations where they may redeem the ticket, and a barcode or oilier machine readable indicia 410 to be read by a tournament style gaming machine or oilier redemption machine, to enable an associated database record to be referenced. Note that this ticket style would be best suited to casino redemption using an automated redemption teller machine equipped with a ticket barcode (for example) reader since it contains no human readable redemption code that may be keyed-in for online verification. The ticket 402 may include oilier information and/or graphics.

Figure 4B:
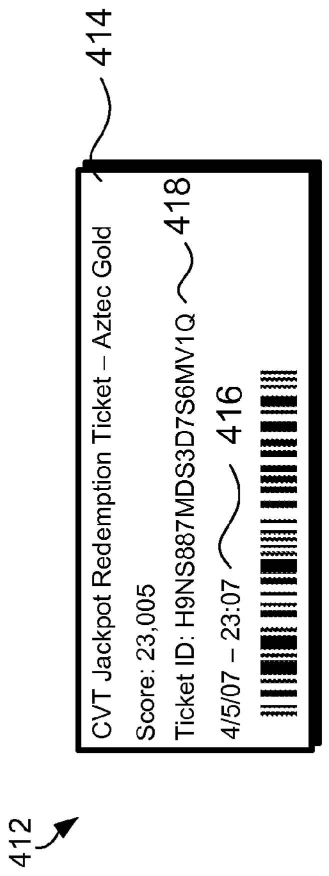
FIG. 4B depicts a second Daily Progressive Jackpot Redemption ticket style used within the tournament style gaming model, according to an embodiment of the present invention.

FIG. 4B depicts a second exemplary daily progressive jackpot redemption ticket 412, such as may be printed at step 314 in FIG. 3. Ticket 412 features a slightly different info tag 414 (it displays a game title instead of the date), a timestamp 416 used for deterring player disputes, and a human readable code 418 that may be keyed in by the ticket holding player to check the status of the ticket 412 over (e.g., the casino network or the Internet). This ticket style may be advantageously used for both casino redemption and online redemption. Other ticket styles are possible, as those of skill in this art will recognize. Indeed, tournament style gaming daily progressive jackpot redemption tickets could take on a number of formats; the examples included herein are not presented in a limiting sense, but are instead intended to clarify the role and features of such tickets with respect to tournament style gaming according to embodiments of the present invention.

Figure 5:
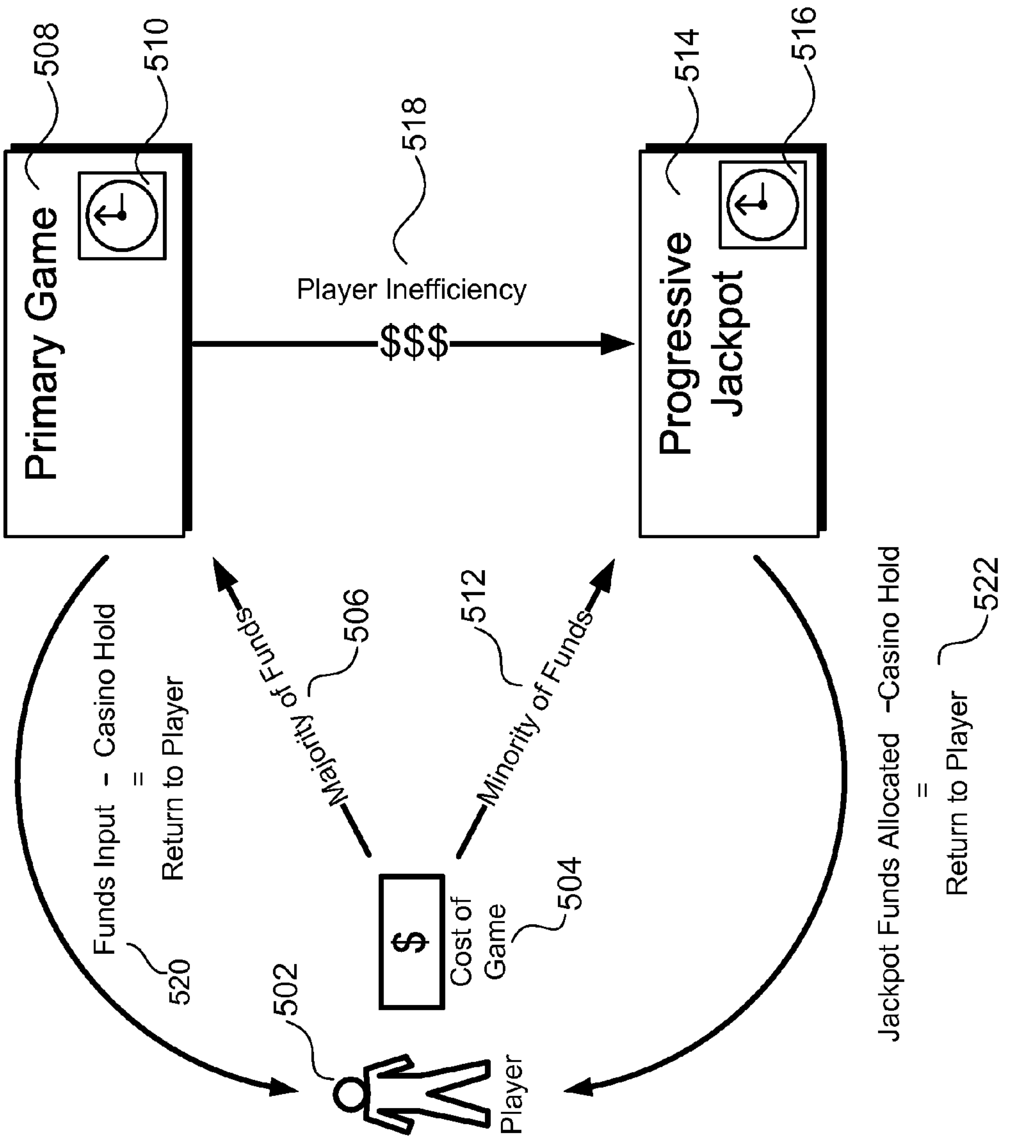
FIG. 5 demonstrates how funds input by the player may be allocated, wagered, and returned in tournament style games, according to an embodiment of the present invention.

FIG. 5 demonstrates how funds input by the player may be allocated, wagered, and returned in tournament style games, according to embodiments of the present invention. When the player 502 makes the decision to wager his funds 504 in a tournament style game featuring the Daily Progressive Feature, his monies are divided, with the majority 506 (over 90% according to one exemplary embodiment) being allocated to fund the primary game 508 (such as video poker, for example). As the player engages in primary game play (detailed in FIG. 2) the game's clock 510 continues to run until time has expired, signaling the end of the game. The length of the player's primary game may be player and/or operator-customizable, but it is envisaged that most gaming sessions may last for less than fifteen minutes, although nothing prevents the gaming sessions from lasting longer.

In parallel, a minority of the funds (e.g., less than 10% in the example developed herein) wagered by the player 512 are allocated to the game's daily progressive jackpot 514. These fluids are pooled with the jackpot-allocated funds of all other players playing the same (according to one embodiment, and different games in other embodiments) tournament style game in the same day, and may be awarded at the end of that day to the player (or players in the event of a tie) with the highest cumulative score. This means the daily progressive jackpot cycles in 24 hour increments. It should be noted that tournament style gaining according to embodiments of the present invention may be configured such that the progressive jackpot is awarded more frequently (e.g., every three hours, every eight hours, or less frequently such as, for example, every other day or at the end of the week). The "end of a day" in this model (i.e. the hour at which, one daily high, score progressive jackpot ends and another begins) may be defined by the casino to generate maximum activity on its gaining machines. For example, a casino that sees its highest level of customer traffic at noon may wish, to define noon as the end of its daily high score progressive cycle so that as many players as possible will be contending to win the daily jackpot. For jackpot networks that span multiple casinos, the "end of the day" must be the same for all participating properties.

According to embodiments of the present inventions, each unit of time in the Player's primary game contract has a cash value that can be expressed by the formula: Player Wager Size—Progressive Jackpot Allocation/Contract Duration. When the player plays more slowly than is optimal, he forfeits the value of the time he has wasted. An "optimal" rate of game play, according to an embodiment of the present invention, may be configured to correspond to a fastest possible pace of game play. To stabilize the game's internal accounting, to maintain the game's Return to Player (RTP) within a standard and predictable range, to protect players collectively from their own inefficiency, and to satisfy gaming regulators, tournament style games according to embodiments of the present inventions convert wasted time (wasted time may be defined, according to an embodiment of the present inventions, as that aggregate time during which the player could have placed additional sub-wagers had he or she been playing at the optimal rate of game play) into currency and men feed mat currency into the daily progressive jackpot 518 so that wasted funds will be eventually returned to players. Notice how this protection is collective: a player who plays slowly is less likely to earn the daily high score and recoup the currency he has lost through inefficiency than the player who plays quickly, i.e. efficiently. This dynamic is significant. If all players shared the value of wasted time equally, the game would not truly reward rapid play (an important element of tournament play) and would thus lose a measure of excitement.

When played optimally, the primary game returns funds to the player using the formula: Funds Input−Casino Hold=average Return to Player (RTP) percentage as shown at 520 and the secondary game returns funds to the player using the formula: Jackpot Funds Allocated−Casino Hold=average Return to Player (RTP) percentage, as shown at 522.

For purposes of illustration, the following will detail a sample game using arbitrary figures. In this example, the daily progressive jackpot is awarded on a 24 hour cycle and the player purchases a five minute contract to play for $5. In this example, the operator has configured the game to allocate 99% of each wager input to the primary game and 1% of each wager input to the progressive Jackpot. The operator has also configured the game to hold 10% of funds wagered for the house and return 90% to the player. In this case, the player's input into the primary game is: ($5−the 1% jackpot allocation) or $4.95. The player's theoretical return for the primary game would be $4.95−($4.95×0.1) or $4.46 (the theoretical casino hold in this case is 49.5 cents), although the player's actual results will be determined randomly.

Should this same player achieve the daily high score on the game and should that high score not be exceeded during the calendar day in question, and should the daily jackpot have finished at exactly $10,000, the player's actual jackpot return would be $10,000−($10,000×0.1) or $9,000. It is important to note that these figures assume optimal play for the sake of simplicity. Should the player play inefficiently, his theoretical return in the primary game would be lower than $4.46.

Figure 6:
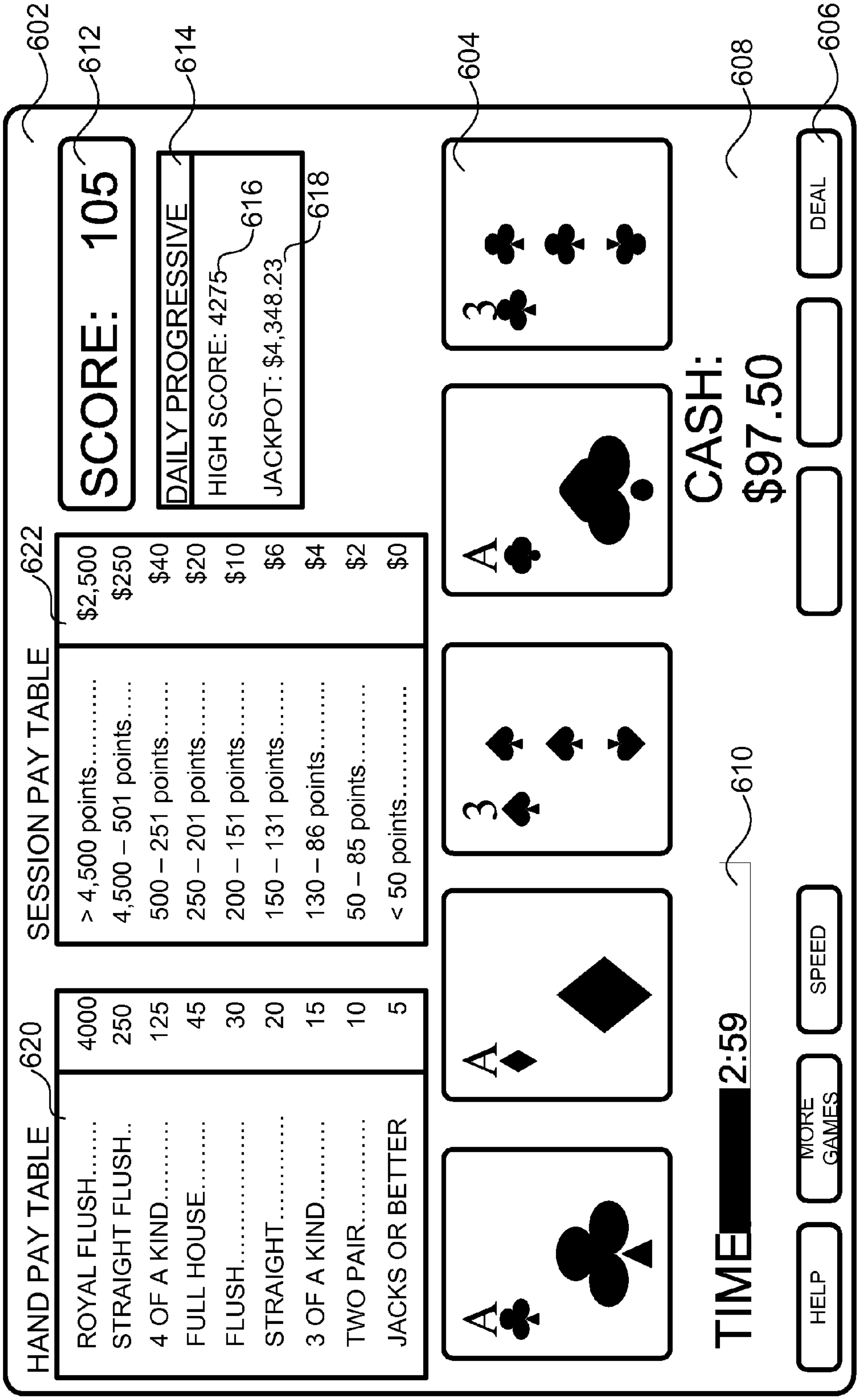
FIG. 6 depicts an exemplary user interface on a tournament style video poker machine, according to an embodiment of the present invention.

FIG. 6 depicts an exemplary user interface (UI) 602 on a gaming machine configured for tournament style video poker machine, according to an embodiment of the present invention. Like a conventional video poker UI, the tournament style interface displays cards 604, touchscreen action buttons such, as DEAL 606, and the player's current cash balance 608. Tournament style video poker games, however, may display additional information not seen on traditional machines such as, for example, a time meter 610 to inform the player to how much time remains on his contract, a score meter 612 to inform the player of his current score, and a daily progressive meter 614 to inform the player of the current daily high score 616 and how much money is currently in the jackpot, as shown at 618.

Tournament style video poker games must also display two pay tables instead of one. These include a Hand Pay Table 620, which associates each reward-generating hand with a specific score and a Session Pay Table 622, which, associates cumulative score ranges for a completed gaming session with specific cash rewards. Working in concert, both, the Hand and Session Pay Tables contribute to a layered game in which the player experiences many small "wins" (i.e. score-generating hands) that build toward the opportunity to achieve a more exciting big win in the session payout. The player's game features yet another layer with the opportunity to win the daily progressive jackpot if and when his cumulative session score becomes the new daily high score. The daily high score progressive feature is expected to stimulate casino play in a new an unexplored way, by appealing not just to the player's desire to win money, but also to his competitive nature. High score features on pinball and arcade games have proven to stimulate play even when the player has no opportunity to earn a financial reward. It is believed that casino games that present players with the opportunity to demonstrate mastery over other players by beating their existing high score and to win money during that process will appeal to the innate competitive nature of the player and provide casino operators with a powerful new way to earn revenue.

Figure 7:
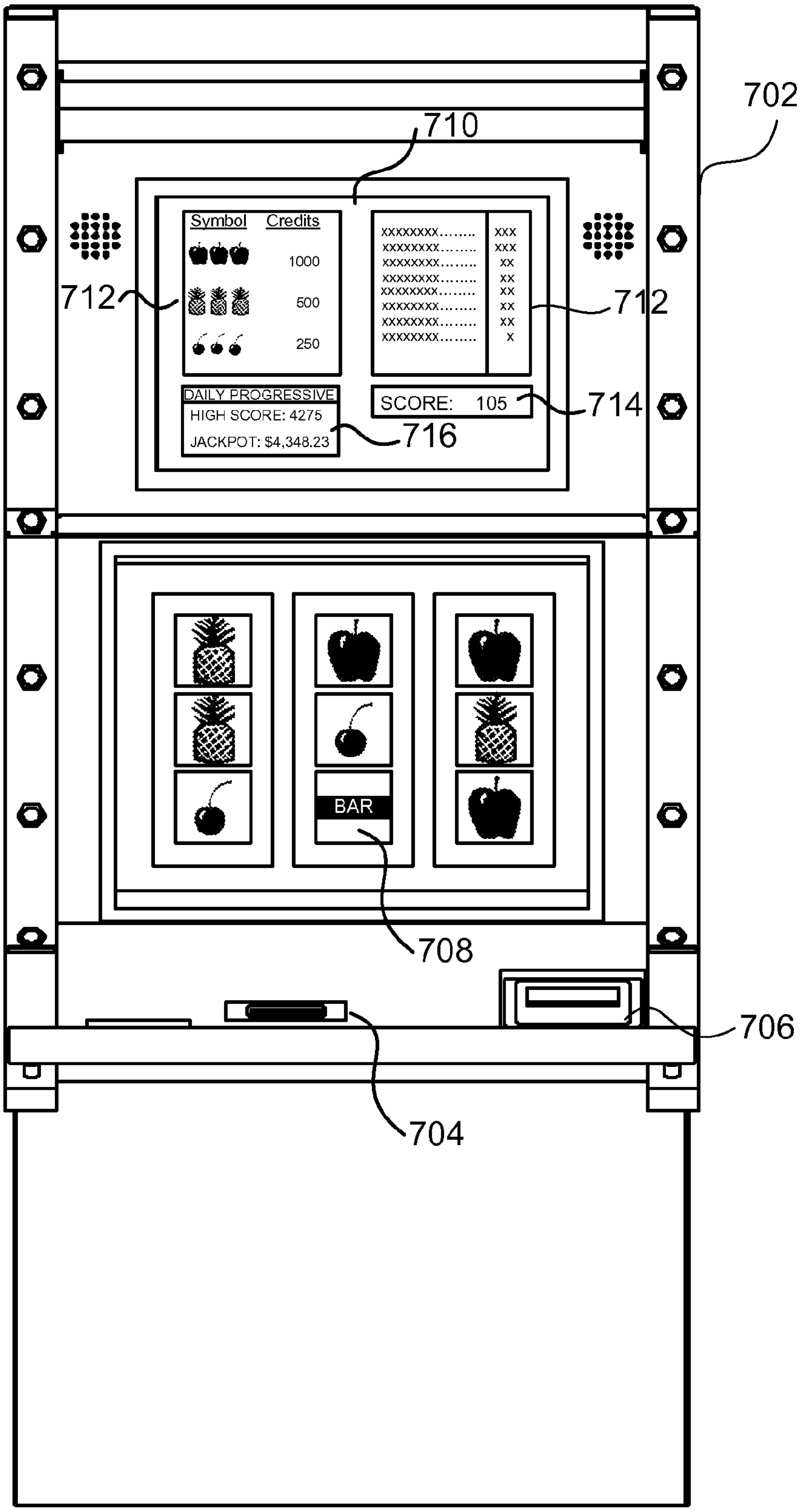
FIG. 7 depicts how a tournament style slot machine may be offered to players in a multi-screen format, according to an embodiment of the present invention.

FIG. 7 depicts how a tournament style slot machine may he offered to players in a multi-screen format, according to further embodiments of the present invention. Tournament style games such as the slot machine 702 depicted in FIG. 7 may advantageously use traditional casino gaming cabinets and game hardware, including traditional peripherals like ticket printers 704 and bill accepters 706, and traditional I/O devices like primary gaming screens 708 and optional secondary gaming top screens 710.

The user interface depicted in FIG. 6 is designed for a single screen gaming machine. Multi-screen gaming machines could be advantageously used in the tournament style gaming model as well, as a gaming machine's top screen 710 could be used to display information like pay tables 712, the player's current score 714, and the current status of the game's progressive jackpot 716. Alternatively, the player's score could be displayed on the game's primary (e.g., lower) screen and pay tables and jackpot information could be displayed on the top screen. The tournament style gaming model according to embodiments of the present invention is flexible, in that it may be offered on a wide variety of gaming cabinets of both the single and multi-screen variety and in a wide variety of display styles.

It is believed that server-based gaming—a model in which game operators have file ability to dynamically download a wide variety of gaming content to each machine on their gaming floor—represents the future of casino gaining. Accordingly, the tournament style gaming model has been designed to function on existing game cabinets and hardware to ensure that it may compliment the server-based gaining model and be included in server-based game menus in the future.

While the previous figures have featured a tournament style video poker game, FIG. 7 demonstrates that the present tournament style model may be applied just as successfully to video slot machines. As is shown in FIG. 8, the game flow on a tournament style slot machine is slightly simpler on than that of a tournament style video poker machine, as most slot machines offer the player less interaction and fewer decision making opportunities.

Figure 8:
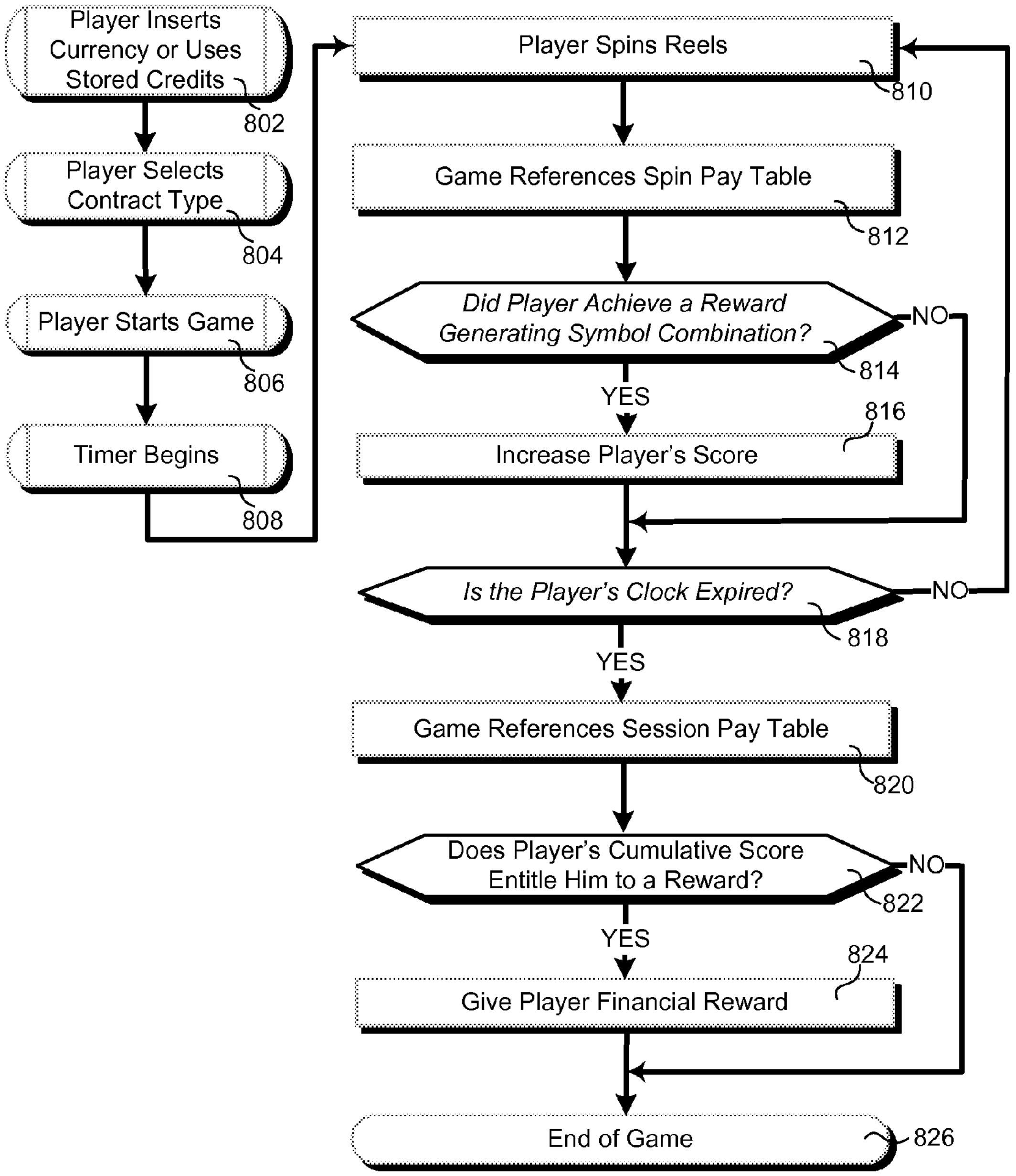
FIG. 8 shows game flow on a tournament style slot machine, according to an embodiment of the present invention.

FIG. 8 shows the game flow on a tournament style slot machine, according to an embodiment of the present invention. As is the case with tournament style video poker machines, the player must insert funds or use stored credits as shown at 802 to initiate a game. The player may then select a contract type 804. The game may then begin, as shown at 806 and the game's timer begins as shown at 808. The player then takes some action to spin the game's reels as shown 810, usually by pressing a button or pulling a lever.

After the reels have spun, the game checks an internal symbol table 812 to determine if a score-generating symbol combination has occurred, as shown at 814. If a score-generating symbol combination has not occurred (no branch of step 814), the games takes no special action and the flow proceeds to step 818. If a score-generating symbol combination has occurred (yes branch of step 814), the symbol combination the player has achieved is used as an index into the hand pay table (the first of the two pay tables) and the player's corresponding cumulative session score is increased by an amount indicated by the consulted hand pay table, as shown at 816.

So long as a player has time remaining in his session, he will retain the ability to spin the reels and try to increase his cumulative score, as indicated by the No branch of step 818. When the player's timer reaches zero as shown by the Yes branch of step 818, then the player's cumulative score is captured and compared, as shown at 820, to the second of the game's internal pay tables, the session pay Table. As shown at step 822, if the player's cumulative score meets the minimum criteria associated with a reward within the session pay table, the player is given a credit award, as indicated at 824. If not the game ends at 826. After the player's time has expired and he has been paid any credits owed to him, the player's gaming session is over 826. Unlike traditional single-spin, single-wager slot machine games, the tournament style slot machine player's game session has consisted of many spins (i.e. sub-wagers) that have contributed to one large game and the cumulative score earned across the many spins of the large game is used to look up the reward due to the player, if any.

Figure 9:
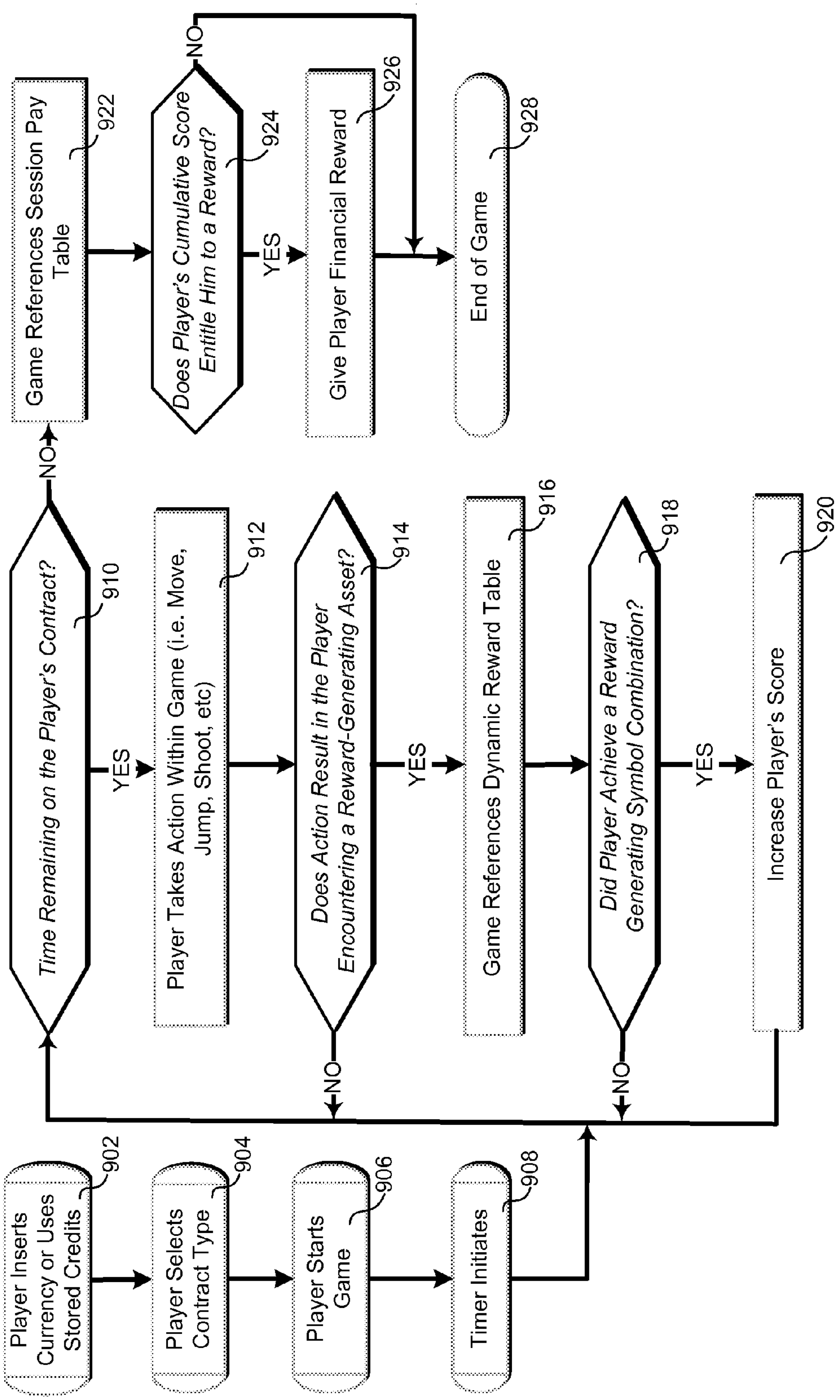
FIG. 9 shows game flow on a tournament style casino video game, according to an embodiment of the present invention.

FIG. 9 demonstrates game flow on a tournament style casino video game, according to an embodiment of the present invention. Time-based casino video games are described in detail in the current Assignee's patent application Ser. Nos. 12/110,112, 12/110,125, 12/110,132, 12/110,140, all filed Apr. 25, 2008, and 11/457,137, filed Jul. 12, 2006, which applications are hereby incorporated herein by reference in their entireties. Such games convert scoring events occurring during console style video game play into opportunities for the player to win funds. For example, a player playing a casino version of the popular video game Pac-Man® might have the opportunity to win funds every time the Pac-Man® character eats a bonus cherry or a blinking ghost appearing within the maze in which his character is navigating.

As shown in FIG. 9 and as is the case with other tournament style games according to embodiments of the present invention, the player must insert fluids or use stored credit as shown at 902 before initiating a tournament style casino video game. As shown at 904, the player may then select a contract type and initiates the game as shown at 906 such that the game's timer begins, as shown at 908. As long as the player has time remaining in his contract, he will have the opportunity to continue playing, as indicated at 910.

In every game, the player will have the ability to take actions as shown at 912 (i.e. moving through the maze or eating a power pellet to continue with the Pac-Man® example), with some those actions triggering opportunities for the player to score points (these are often actions that would also lead to the player scoring points in a non-casino version of the game). Points scored by the player will contribute to a cumulative score that will later determine the size of the player's financial reward, if any.

Whenever the player's action leads him (or the character controlled by the player) to interact with a score-generating asset in the game as shown at 914 (i.e. a bonus cherry in the Pac-man® maze), the game references an internal table as shown at 916 to determine if a score-generating event has occurred, as called for by step 918. If a score-generating event has not occurred the games takes no special action and the game play reverts to step 910, as shown by the No branch, of 914. If a score-generating event has occurred, the game references a dynamic reward table through, its random number generator (or a source of random numbers such as a network connection in the case wherein the random numbers are generated remotely from the gaining machine) to determine how many points the player has scored. Afterward, the player's cumulative session score is increased accordingly, as shown at 920, whereupon game play reverts to step 910.

So long as a player has time remaining in his session, he or she will retain the ability to take actions within the game and try to increase his score. When the player's timer reaches zero as shown by the No branch of step 910, then the player's cumulative score is captured and compared to the game's internal session pay table as shown at 922. If it is determined in step 924 that the player's cumulative score meets the minimum criteria associated to a reward within the session pay table 924, he is given a credit award at step 926. If not, the game play proceeds to step 928, the end of the game. After the player's time has expired and he has been paid any credits owed to him, the player's gaining session is over as shown at 928.

Figure 10:
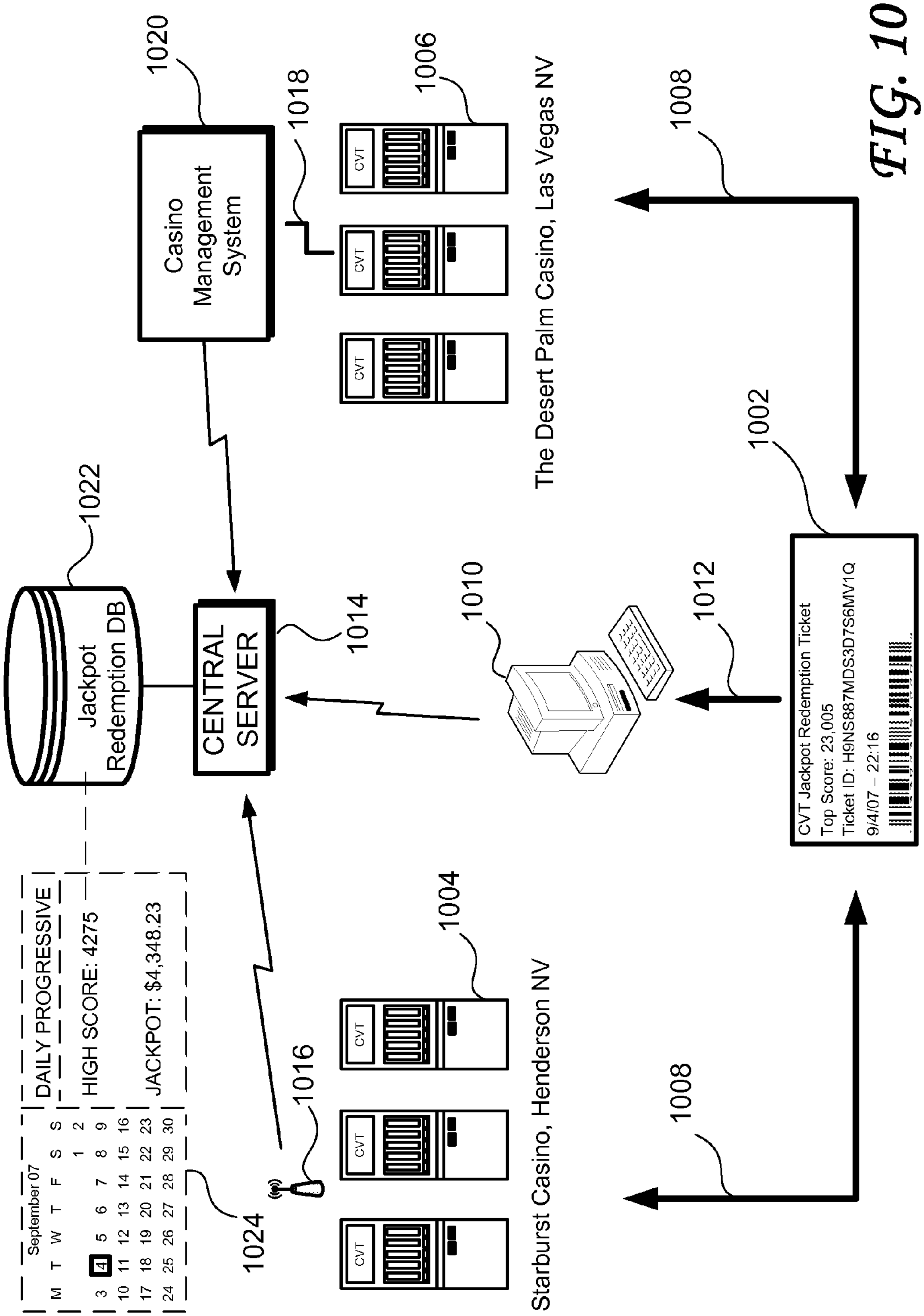
FIG. 10 illustrates how daily high score progressive jackpot tickets may be issued and checked in the tournament style gaining model, according to an embodiment of the present invention.

FIG. 10 illustrates how daily high score progressive jackpot tickets may be issued and checked in the tournament style gaming model according to embodiments of the present invention. As was detailed relative to FIGS. 4A and 4B, tournament style games that are configured to offer a daily high score progressive jackpot issue jackpot redemption tickets 1002 to players who have earned the highest score of the calendar day (or other predetermined time period) in which they are playing. FIG. 10 shows how gaming machines at multiple locations such as the Starburst Casino in Henderson, Nev. 1004 and The Desert Palm Casino in Las Vegas, Nev. 1006 could be networked together to establish a common jackpot pool. The physical games at both locations may be configured to issue and to check, as suggested at 1008, the status of jackpot redemption tickets. Players checking a winning ticket may be issued cash, a ticket representing the cash value of the jackpot or any oilier form of value, such as credit or electronic money, for example.

In addition, if the game operators wish to make such a feature available, the status of jackpot redemption tickets may be checked at a player's home or hotel using a personal computer 1010 and an internet connection. Alternatively, the player's mobile telephone may be used to check the status of a jackpot redemption ticket or may be used by the casino as a player notification device by pushing a notification to the player's phone. According to another scenario, players wishing to cheek the status of a ticket would enter a code printed on the ticket into a secure web site dedicated for that purpose, as suggested by 1012. According to some embodiments of the invention described herein, the players holding winning tickets may return to the casino and enter their ticket into a participating machine to receive their award. In other embodiments, players may have the funds mailed to their home in the form of a check or transferred to a designated account electronically.

In the redemption model depicted, information about the status of each daily jackpot may be stored within a central jackpot server 1014. Gaming machines on each floor or estate may be coupled to the central jackpot server wirelessly as suggested at 1016 or through a wired connection, as suggested at 1018, optionally via a participating casino's casino management system 1020 and/or through a packet-switched network such as the Internet. The central jackpot server may contain or may have access to a jackpot redemption database 1022 in which critical information 1024 about each day's jackpot may be organized by calendar day and stored. This information may include the size of the jackpot, the daily high score, and all of the scores, codes, game info, and timestamps associated with jackpot redemption tickets issued on each particular day.

While the enclosed figure details a network comprising of two casinos in one US state, larger networks comprising numerous states and casinos are also possible. Indeed, embodiments of the present invention may be readily configured that span international border boundaries.

In addition to daily high score jackpots, weekly or yearly progressive jackpots may be offered in this model. Tournament style gaming allows game operators the flexibility to offer numerous layers and hierarchies of progressive jackpots to keep their customers engaged. If desired, casino operators may allow players to select which progressive jackpots they wish to contend for from a number of options. For example, player could elect to contend for a state jackpot, a country jackpot, a global jackpot, a jackpot for female players, a jackpot for male players, the daily jackpot on a given date such as a birthday date, Valentine's Day, a special national event date, to name but a few possibilities. In this embodiment, each jackpot a player elects to contend for is funded by a predetermined portion of the player's individual wagers.

Progressive jackpots may also apply across families of games, such that a player wagering on a tournament style "Jacks or Better" poker game may compete against a player wagering on a tournament style "Double Double Bonus" poker game for a common progressive reward. Going further, a score standardization system may be employed to allow slot machine players to compete against video poker players for a common progressive jackpot by converting player scores into a performance index that may be fairly compared across different families of games.

While the foregoing detailed description has described several embodiments of this invention, it is to be understood that the above description is illustrative only and not limiting of tire disclosed embodiments. For example, while tournament style video poker and slot machines are described herein, the present tournament style model may be readily applied to any popular casino game including video keno, video roulette, video craps, and video bingo or to many popular arcade games including pinball, maze games like Pac-Man®, and video games like Super Mario Bros.® or Frogger®. Indeed, a number of modifications will no doubt occur to persons of skill in this art. All such modifications, however, should be deemed to fall within the scope of the present inventions.

What is claimed is:

1. A method of determining rewards due to a player of an electronic game on a regulated gaming machine, wherein the regulated gaming machine is configured to carry out a plurality of processes for:

accepting money from a player and using a first portion of the money to fund a progressive jackpot to be awarded after a predetermined point in time and using a second portion of the money, to purchase a predetermined duration of game play on a primary game;

allowing the player to initiate sub-wagers during the predetermined duration and keeping a cumulative score according to outcomes of the initiated sub-wagers;

when the predetermined duration is over, determining whether the player's cumulative score entitles the player to a reward and if so, paying the reward to the player;

determining whether the player initiated sub-wagers at a rate that is lower than an optimal rate at which the player could have placed sub-wagers during the predetermined duration and, if so, increasing the progressive jackpot, and at or after the predetermined point in time, awarding at least a portion of the progressive jackpot to at least the player if the player's cumulative score was a high score that remains a high score at the predetermined point in time.

2. The method of claim 1, wherein the predetermined point in time is one of hourly, daily, weekly, monthly and yearly.

3. The method of claim 1, wherein the gaming machine is coupled to a plurality of other gaming machines over a network and wherein the method further includes a step of storing at least one high score from among all of the plurality of other gaming machines on a server coupled to the network and a step of determining whether the player's cumulative score exceeds at least one high score stored on the server and a step of awarding at least a portion of the progressive jackpot to the player if one of the high scores stored on the server is the player's high score.

4. The method of claim 1, further including a step of displaying a current size of the progressive jackpot on the gaming machine.

5. The method of claim 1, further including a step of providing a jackpot redemption ticket to the player if the player's score is established as the high score, the jackpot redemption ticket enabling the player to check whether the player has won at least a portion of the progressive jackpot.

6. The method of claim 1, wherein, the accepting step is carried out with the electronic game on which game play is enabled being a gaming console-type video game.

7. The method of claim 1, wherein the accepting step is carried out with the electronic game on which game play is enabled being an arcade-type video game.

8. The method of claim 1, wherein the accepting step is carried out with the electronic game on which game play is enabled being a video pinball game.

9. The method of claim 1, further comprising a step of configuring the regulated game of chance such that, on average, players that initiate a greater number of sub-wagers during the predetermined duration earn a higher cumulative score and a higher reward than players that initiate a comparatively smaller number of sub-wagers during the predetermined duration.

10. The method of claim 1, wherein the keeping step is carried out with the player's cumulative score having no cash value before the predetermined duration is over.

11. The method of claim 1, wherein the keeping step is carried out with the player's cumulative score having no cash value until after the predetermined duration is over and only having a non-zero cash value if the player's score reaches or exceeds at least one predetermined threshold value.

12. The method of claim 3, wherein the gaming machine is located in a first casino and wherein at least one of the plurality of gaming machines is located in a second casino.

13. The method of claim 5, wherein the jackpot redemption ticket providing step is carried out with the jackpot redemption ticket being configured to enable the player to check whether the player has won at least a portion of the progressive jackpot at least one of at the gaming machine and remotely.

14. A regulated gaming machine configured to enable a player to play an electronic game, comprising:

a user interface, the user interface being configured to accept money from a player, a first portion of the money being used to fund a progressive jackpot to be awarded after a predetermined point in time and a second portion of the money being used to purchase a predetermined duration of game play on a primary game, the user interface being further configured to enable the player to initiate sub-wagers during the predetermined duration;

a player score meter to track a cumulative score of the player according to outcomes of the initiated sub-wagers for the predetermined duration;

wherein the gaming machine is configured, when the predetermined duration is over, to determine whether the cumulative score entitles the player to an immediate reward and if so, to pay the reward to the player and to determine whether the cumulative score matches or exceeds a pre-stored high score and if so, establishing the cumulative score as a new high score, and wherein the gaming machine is further configured, at or after the predetermined point in time, to determine whether the player initiated sub-wagers at a rate that is lower than an optimal rate at which the player could have placed sub-wagers during the predetermined duration and, if so, to increase the progressive jackpot, the gaming machine being further configured to award at least a portion of the progressive jackpot to at least the player if the player's cumulative score was established as a high score and remains a high score at the predetermined point in time.

15. The gaming machine of claim 14, wherein the predetermined point in time is one of hourly, daily, weekly, monthly and yearly.

16. The gaming machine of claim 14, wherein the gaming machine is configured to store at least one high score on a server coupled to the network, the gamine machine being further configured to award at least a portion of the progressive jackpot to at least the player if one of the high scores stored on the server is the player's high score.

17. The gaming machine of claim 14, further including a progressive jackpot meter to display a current size of the progressive jackpot.

18. The gaming machine of claim 14, wherein the gaming machine is further configured to provide a jackpot redemption ticket to the player if the player's cumulative score is established as the new high score, the jackpot redemption ticket enabling the player to check whether he or she has won at least a portion of the progressive jackpot.

19. The gaming machine of claim 14, wherein the electronic game is a gaming console-type video game.

20. The gaming machine of claim 14, wherein the electronic game is an arcade-type video game.

21. The gaming machine of claim 14, wherein the electronic game is a video pinball game.

22. The gaming machine of claim 14, wherein the gaming machine is further configured such that, on average, players that initiate a greater number of sub-wagers during the predetermined duration earn a higher reward than players that initiate a comparatively smaller number of sub-wagers during the predetermined duration.

23. The gaming machine of claim 14, wherein the player's cumulative score has no cash value before the predetermined duration is over.

24. The gaming machine of claim 14, wherein the player's cumulative score has no cash value until after the predetermined duration is over and only has a non-zero cash value if the player's cumulative score reaches or exceeds at least one predetermined threshold value.

25. The gaming machine of claim 18, wherein the jackpot redemption ticket is configured to enable the player to check whether the player has won at least a portion of the progressive jackpot at least one of at the gaming machine and remotely.

26. A method of determining rewards due to a player of an electronic game on a regulated gaming machine, wherein the regulated gaming machine is configured to carry out a plurality of processes for:

accepting money from a player and using a first portion of the money to purchase a predetermined duration of game play on a primary game and using a second portion of the money to fund a progressive jackpot to be awarded after a predetermined point in time;

initiating the primary game and accepting a plurality of player-initiated sub-wagers;

keeping a cumulative score across all of the plurality of sub-wagers, the cumulative score increasing whenever one of the plurality of sub-wagers has a successful outcome;

at the end of the predetermined duration, determining whether the cumulative score entitles the player to a reward and if so, paying the reward to the player;

determining whether the player wasted time by initiating sub-wagers at a rate that is lower than an optimal rate at which the player could have placed sub-wagers during the predetermined duration and, if so, increasing the progressive jackpot by a value of the wasted time, and at or after the predetermined point in time, awarding at least a portion of the progressive jackpot to at least the player if the player's cumulative score was established as a high score and remains a high score at the predetermined point in time.

27. The method of claim 26, wherein the awarding step is carried out with the high score being updated with high scores of other players until the predetermined point in time.

28. The method of claim 26, wherein the determining step is carried out with the value of the wasted time being calculated using the first portion of the money and a number of sub-wagers initiated by the player during the predetermined duration.

29. The method of claim 26, wherein the accepting and rewarding steps are carried out with the progressive jackpot returning to the player, on average, an amount equal to a difference between the second portion of the money and a casino hold.

30. The method of claim 26, wherein the initiating step is carried out with the primary game returning to the player, on average, an amount equal to a difference between the first portion of the money and a casino hold, provided that the player initiates sub-wagers at the optimal rate during the predetermined duration.

* * * * *